United States Patent
Bock et al.

(10) Patent No.: US 8,327,869 B2
(45) Date of Patent: Dec. 11, 2012

(54) BALL CHECK VALVE ASSEMBLY FOR HYDRAULIC CONTROL CIRCUIT

(75) Inventors: Peter Donald Bock, Commerce Township, MI (US); Roman Shestakov, Lambertville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1075 days.

(21) Appl. No.: 12/115,773

(22) Filed: May 6, 2008

(65) Prior Publication Data

US 2009/0032116 A1 Feb. 5, 2009

Related U.S. Application Data

(60) Provisional application No. 60/952,972, filed on Jul. 31, 2007.

(51) Int. Cl.
*G05D 11/00* (2006.01)
(52) U.S. Cl. ......... 137/112; 137/111; 137/113; 137/513
(58) Field of Classification Search ............... 137/112, 137/111, 625.44, 113, 513
See application file for complete search history.

(56) References Cited

U.S. PATENT DOCUMENTS

| | | | |
|---|---|---|---|
| 3,664,362 A * | 5/1972 | Weise | 137/102 |
| 5,040,567 A | 8/1991 | Nestler et al. | |
| 5,190,356 A * | 3/1993 | Knowles | 303/7 |
| 5,531,244 A * | 7/1996 | Siver | 137/315.21 |
| 5,601,506 A | 2/1997 | Long et al. | |
| 5,799,928 A * | 9/1998 | Siver | 251/214 |
| 5,941,270 A * | 8/1999 | Nogle | 137/112 |
| 6,484,754 B1 * | 11/2002 | Muth et al. | 137/625.66 |
| 2006/0201559 A1 * | 9/2006 | Ege et al. | 137/625.44 |
| 2006/0266425 A1 * | 11/2006 | Erath et al. | 137/625.44 |

FOREIGN PATENT DOCUMENTS

| | | |
|---|---|---|
| CN | 2148233 Y | 12/1993 |
| CN | 2234539 Y | 9/1996 |
| DE | 2262036 A1 | 7/1974 |
| DE | 4400108 C1 | 3/1995 |
| GB | 685203 A | 12/1952 |
| GB | 1 395 417 A | 7/1973 |
| GB | 2081848 A | 2/1982 |
| WO | 2004085852 A2 | 10/2004 |

* cited by examiner

*Primary Examiner* — Eric Keasel
*Assistant Examiner* — Minh Le
(74) *Attorney, Agent, or Firm* — Quinn Law Group, PLLC

(57) ABSTRACT

A fluid distribution control element for use in a ball check valve assembly having a valve housing defining a valve chamber and a first inlet opening spaced from a second inlet opening. The control element is arranged inside the valve housing to transition along a substantially linear path of displacement. The control element includes first and second obstruction elements each being configured to respectively fluidly seal the first and second inlet openings. The control element also includes a web portion, having a web length, which secures the first obstruction element to the second obstruction element. The web length is configured to restrict one of the first and second obstruction elements from sealing a respective inlet opening when the other obstruction element is sealing the other respective inlet opening. The web length is further configured to minimize the seat-to-seat distance the control element must travel along the linear path of displacement.

1 Claim, 2 Drawing Sheets

BALL CHECK VALVE ASSEMBLY FOR HYDRAULIC CONTROL CIRCUIT

CLAIM OF PRIORITY AND CROSS-REFERENCE TO RELATED APPLICATIONS

This application claims the benefit of and priority to U.S. Provisional Patent Application No. 60/952,972, filed on Jul. 31, 2007, which is hereby incorporated by reference in its entirety.

TECHNICAL FIELD

The present invention relates generally to hydraulic check valves, and more particularly to ball check valves for use in vehicle powertrain hydraulic control units to reduce seat-to-seat transition time and thereby improve system response time.

BACKGROUND OF THE INVENTION

Generally, a motor vehicle automatic transmission includes a number of gear elements, such as planetary gear sets, for coupling the transmission's input and output shafts, and a related number of hydraulically actuated torque establishing devices, such as clutches and brakes (the term "torque transmitting device" often used to refer to both clutches and brakes), that are selectively engageable to activate the above mentioned gear elements for establishing desired forward and reverse speed ratios between the input and output shafts. Engine torque and speed are converted by the transmission in response to the tractive-power demand of the motor vehicle.

Shifting from one speed ratio to another is performed in response to engine throttle and vehicle speed, and generally involves releasing one or more (off-going) clutches associated with the current or attained speed ratio, and applying one or more (on-coming) clutches associated with the desired or commanded speed ratio. To perform a "downshift", a shift is made from a low speed ratio to a high speed ratio. The downshift is accomplished by disengaging a clutch associated with the lower speed ratio, and engaging a clutch associated with the higher speed ratio, to thereby reconfigure the gear set to operate at the higher speed ratio. Shifts performed in the above manner are termed clutch-to-clutch shifts and require precise timing in order to achieve high quality shifting.

Some transmission configurations incorporate a hydrodynamic input device, such as a torque converter, positioned between the engine and the transmission. The torque converter is a hydrokinetic fluid coupling employed predominantly to allow the engine to run without stalling when the vehicle wheels and transmission gears come to a stop, and to provide torque multiplication in the lower speed range of the engine. Certain torque converter assemblies include a torque converter clutch, also known as a lockup clutch, operated to provide a bypass mechanism, allowing the engine to circumvent the torque converter and transmit power directly to the transmission.

The various hydraulic subsystems of an automatic transmission, such as the torque transmitting devices, torque converter assembly, torque converter clutch, etc., are typically controlled through operation of a hydraulic circuit, also known as a hydraulic valve system. The hydraulic circuit traditionally engages (actuates) or disengages (deactivates) the various transmission subsystems through the manipulation of hydraulic pressure generated within a transmission oil pump assembly. The valves used in a conventional hydraulic control circuit commonly comprise electro-hydraulic devices (e.g., solenoids), spring-biased accumulators, spring-biased spool valves, and ball check valves.

Ball check valves derive their name from their use of a spherical fluid control element, referred to in the art as a "ball", to close (seal) and open (unseal) one or more valve ports. Ball check valves are generally used in applications where it is desirable to selectively seal or unseal an opening based upon one or more physical factors such as, for example, pressure gradients, and thereby permit hydraulic fluid to flow in one direction, and prevent fluid flow in another direction. Ball check valves, as discussed herein, should not be confused with ball valves—a distinct type of valve assembly wherein a ball acts as a controllable rotor to stop or direct fluid flow.

In shuttle- or floating-type ball check valves, there are traditionally two independent hydraulic ("inlet") circuits configured to feed a third ("discharge" or "outlet") circuit. In this configuration, when the first inlet circuit is "pressurized" and the second inlet circuit is "exhausted", the check ball is seated against the second inlet port. Accordingly, the second circuit is sealed by the check ball, and the discharge circuit is fed hydraulic fluid by way of the first inlet circuit. Conversely, if the second circuit is thereafter pressurized, and the first circuit exhausted, the check ball will transition or "float" from the seated position against the second inlet port to a seated position against the first inlet port through the generated pressure differential. Consequently, the first inlet circuit is sealed by the check ball, and the discharge circuit is fed hydraulic fluid by way of the second inlet circuit. Additionally, when neither inlet circuit is pressurized, fluid must be allowed to flow from the discharge circuit into at least one of the inlet circuits, which ensures that the discharge circuit is exhausted when neither inlet circuit is pressurized. A typical application in which a shuttle-type ball check valve assembly is used is where the same torque transmitting device (e.g., a clutch) is engaged (i.e., fed hydraulic fluid) from two different ports.

SUMMARY OF THE INVENTION

In order to improve the efficiency and response time of a vehicle powertrain, the present invention provides a novel dual check ball design for a ball check valve assembly. The dual check ball design described hereinbelow reduces the seat-to-seat travel distance of the fluid distribution control element, and thus the travel time required for the fluid distribution control element to switch between operating modes. In so doing, the present invention provides faster and more consistent hydraulic circuit pressurization and a smoother, more responsive shift.

According to one embodiment of the present invention, a ball check valve assembly is provided. The ball check valve assembly has a valve housing that defines first and second openings that are spaced from one another such that respective centers thereof are a seat-to-seat length apart. The ball check valve assembly also includes a fluid distribution control element arranged substantially inside the valve housing. The fluid distribution control element includes a first obstruction element configured to fluidly seal the first opening, and a second obstruction element configured to fluidly seal the second opening. The first obstruction element is connected, secured, or attached to the second obstruction element by a web portion having a web length. The web length is configured to restrict one of the first and second obstruction elements from sealing its respective opening when the other obstruction element is positioned to seal the other respective opening.

According to one aspect of the present embodiment, the fluid distribution control element transitions between the first and second openings along a substantially linear path of displacement. In this instance, the web length is preferably configured to minimize a seat-to-seat distance of travel along the linear path of displacement. The seat-to-seat distance of travel is the length the fluid distribution control element must travel to transition from one seated position (e.g., sealing the first opening) to the other seated position (e.g., sealing the second opening).

In accordance with another aspect, the first and second obstruction elements respectively comprise first and second substantially spherical members. In this respect, the web length is configured such that a center-to-center length between respective centers of the first and second spherical members is less than the seat-to-seat length. Specifically, it is preferred that the center-to-center length is approximately 1 mm less than the seat-to-seat length.

According to yet another aspect of the present embodiment, the fluid distribution control element is characterized by a lack of a continuous connection to the valve housing. It may also be preferred that the fluid distribution control element consists essentially of a single-piece member.

According to another embodiment of the present invention, a ball check valve assembly for use in a hydraulic control circuit of a vehicle powertrain is provided. The ball check valve assembly includes a valve housing which defines a valve chamber, first and second inlet openings laterally spaced from one another such that respective centers thereof are a seat-to-seat length apart, and a discharge port in selective fluid communication with the first and second inlet openings. A fluid distribution control element is arranged inside the valve chamber to transition between first and second openings along a substantially linear path of displacement. The fluid distribution control element includes a first obstruction element configured to fluidly seal the first inlet opening, and a second obstruction element configured to fluidly seal the second inlet opening. The first obstruction element is connected, secured, or attached to the second obstruction element by a web portion having a web length. The web length is configured to restrict one of the first and second obstruction elements from sealing its respective inlet opening when the other obstruction element is sealing the other respective inlet opening. The web length is also configured to minimize a seat-to-seat distance of travel along the linear path of displacement.

According to one aspect of the present embodiment, the first and second obstruction elements respectively comprise first and second substantially spherical members. In this respect, the web length is configured such that a center-to-center length between respective centers of the first and second spherical members is less than the seat-to-seat length. Specifically, it is preferred that the center-to-center length is approximately 1 mm less than the seat-to-seat length.

According to yet another embodiment of the present invention, a check ball valve assembly for use in a hydraulic control unit of a vehicle powertrain is provided. The check ball valve assembly includes a valve housing with a spacer plate operatively secured to a valve upper body to define a valve chamber therebetween. The spacer plate defines first and second circular inlet openings laterally spaced from one another such that respective centers thereof are a seat-to-seat length apart. The valve upper body defines a discharge port in selective fluid communication with the first and second inlet openings.

A fluid distribution control element is arranged substantially inside the valve chamber to transition between the first and second openings along a substantially linear path of displacement. The fluid distribution control element including a first substantially spherical member dimensioned to fluidly seal the first inlet opening when seated therein, and a second substantially spherical member dimensioned to fluidly seal the second inlet opening when seated therein. The first and second substantially spherical members are attached to one another by a web portion having a web length. The web length is configured such that a center-to-center length between respective centers of the first and second spherical members is substantially equal to and less than the seat-to-seat length. In addition, the fluid distribution control element is characterized by a lack of a continuous connection to the valve housing—i.e., spacer plate or valve upper body.

The above features and advantages, and other features and advantages of the present invention will be readily apparent from the following detailed description of the preferred embodiments and best modes for carrying out the invention when taken in connection with the accompanying drawings and appended claims.

DESCRIPTION OF THE PREFERRED EMBODIMENTS

Figure 1:
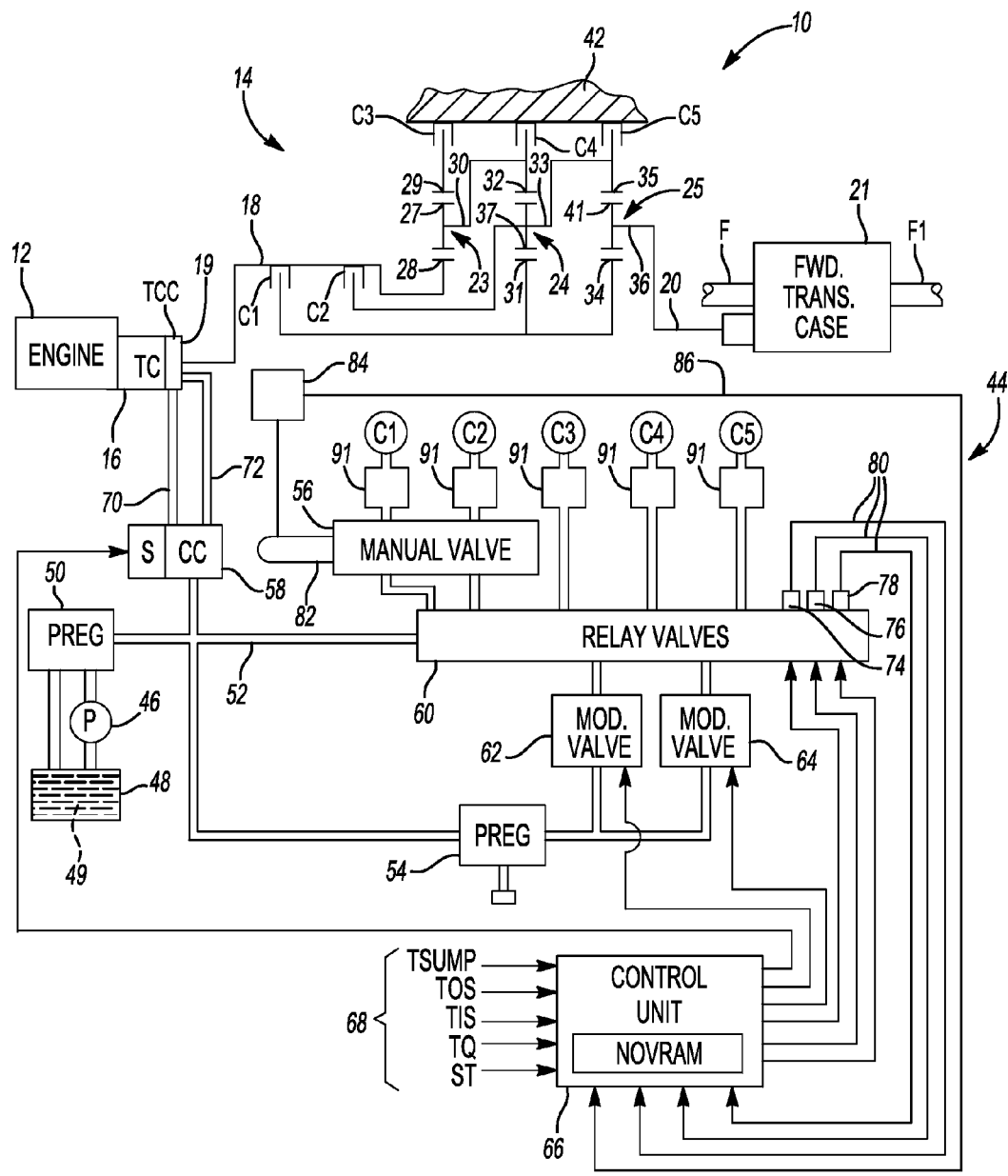
FIG. 1 is a schematic diagram of an exemplary powertrain system for use of the present invention.

The present invention is described herein in the context of an exemplary automotive powertrain—an engine operatively connected to a final drive system via a multi-ratio power transmission through operation of an electro-hydraulic control system. Notably, the gear sets and control elements shown in FIG. 1 hereof have been greatly simplified, it being understood that further information regarding differential gear sets, fluid pressure routings, and so on may be found in the prior art. Furthermore, it should be readily understood that FIG. 1 is merely a representative application by which the present invention may be incorporated. As such, the present invention is by no means limited to the particular configuration of FIG. 1. Finally, the drawings provided herein—i.e., FIGS. 1-3B are not to scale, and are provided purely for clarification purposes. Thus, the particular dimensions of the drawings presented herein are not to be considered limiting.

Referring to the drawing, wherein like reference numbers refer to the same or similar components throughout the several views, FIG. 1 schematically illustrates a vehicle power train, designated generally by reference numeral 10, including a prime mover, such as engine 12, a multi-speed power transmission 14, and a torque converter assembly 16 fluidly coupling engine 12 to transmission 14 via input shaft 18. A torque converter clutch (or TCC) 19 is shown downstream of the torque converter assembly 16. The TCC 19 is selectively engaged to provide a direct mechanical coupling between the engine 12 and transmission input shaft 18. Although not required, a transient torque damper (not shown) may be implemented between the engine 12 and the transmission input shaft 18.

The transmission output shaft 20 is coupled to the driving wheels of the vehicle (not shown) in any of several conventional ways. FIG. 1 depicts a four-wheel-drive (4WD) application in which the transmission output shaft 20 is connected to a transfer case 21 that is coupled to a rear drive shaft R and a front drive shaft F. Typically, the transfer case 21 is manually shiftable to selectively establish one of several drive conditions, including various combinations of two-wheel-drive and four-wheel drive, and high or low speed ranges, with a neutral condition occurring intermediate the two and four wheel drive conditions. Recognizably, the present invention can also be incorporated into additional applications not illustrated in FIG. 1, including, but not limited to, all-wheel drive vehicles (AWD), two-wheel drive vehicles (2WD), etc.

The transmission 14 utilizes a plurality of differential gear sets, preferably in the nature of first, second, and third interconnected planetary gear sets designated generally as 23, 24 and 25, respectively, to establish desired forward and reverse speed ratios between the transmission input and output shafts 18, 20. The first planetary gear set 23 includes an outer gear member 29, typically designated as the ring gear, which circumscribes an inner gear member 28, typically designated as the sun gear, and a planet carrier assembly 30. The planet carrier assembly 30 includes a plurality of pinion gears 27 rotatably mounted on a carrier member and disposed in meshing relationship with both the sun gear member 28 and the ring gear member 29.

The second planetary gear set 24 includes a ring gear member 32 coaxially disposed and rotatable with respect to a sun gear member 31 and a planet carrier assembly 33. The planet carrier assembly 33 includes a plurality of pinion gears 37 rotatably mounted on a carrier member and disposed in meshing relationship with both the sun gear member 31 and the ring gear member 32.

The third planetary gear set 25, similar to the first and second gear sets 23, 24, includes a ring gear member 35 circumscribing a sun gear member 34 and a planet carrier assembly 36. The planet carrier assembly 36 includes a plurality of pinion gears 41 rotatably mounted on a carrier member and disposed in meshing relationship with both the sun gear member 34 and the ring gear member 35. Each of the carriers described above can be either a single-pinion (simple) carrier assembly or a double-pinion (or compound) carrier assembly.

Still referring to FIG. 1, the input shaft 18 is continuously connected to the sun gear 28 of the first gear set 23, selectively connectable to the sun gears 31, 34 of the second and third gear sets 24, 25 via clutch C1, and selectively connectable to the carrier assembly 33 of the second gear set 24 via clutch C2. The ring gears 29, 32, 35 of first, second and third gear sets 23, 24, 25 are selectively connectable to a stationary member, such as transmission housing or casing 42, via brakes C3, C4 and C5, respectively.

In the embodiment illustrated in FIG. 1, the clutches C1-C5 are fluid-operated (e.g., hydraulic), preferably multi-plate, friction devices. The state of the clutches C1-C5 (i.e., fully-engaged, partially-engaged, or disengaged) can be controlled to provide six forward speed ratios (1, 2, 3, 4, 5, 6), a reverse speed ratio (R) and a neutral condition (N). For example, the first forward speed ratio is achieved by engaging clutches C1 and C5. Downshifting from one forward speed ratio to another is generally achieved by disengaging one clutch—referred to as the off-going clutch—while engaging another clutch—referred to as the on-coming clutch. By way of example, the transmission 14 is downshifted from the second forward speed ratio to the first forward speed ratio by disengaging clutch C4 while contemporaneously engaging clutch C5.

The torque converter clutch 19 and the transmission clutches C1-C5 are controlled by an electro-hydraulic control system, generally designated by reference numeral 44 in FIG. 1. The hydraulic portions of the control system 44 include a pump 46 which draws hydraulic fluid 49 from a sump or reservoir 48, and a pressure regulator 50 which returns a portion of the pump output to reservoir 48 to develop a regulated pressure in line 52. The hydraulic portions of the control system 44 also include a secondary pressure regulator valve 54, a manual valve 56 manipulated by the operator of the vehicle, and a number of fluid control valves, represented herein by first, second, third, and fourth valves 58, 60, 62 and 64, respectively. Each control valve is configured to provide fluid to the apply chamber 91 of its respective clutch C1-C5 at either a full feed state or a regulating state.

The electronic portion of the electro-hydraulic control system 44 is primarily defined by the transmission control unit or controller 66, which is depicted in FIG. 1 as microprocessor-based and conventional in architecture. The transmission control unit 66 controls the fluid control valves 58-64 based, at least in part, on a number of inputs 68 to achieve a desired transmission speed ratio. Such inputs include, for example, signals representing the transmission input speed (TIS), a driver torque command (TQ), the transmission output speed (TOS), and the hydraulic fluid temperature (TSUMP). The sensors traditionally employed for developing such signals may be conventional in nature, and have been omitted for simplicity.

The control lever 82 of manual valve 56 is coupled to a sensor and display module 84 that produces a diagnostic signal on line 86 based on the position of the control lever 82; such signal is conventionally referred to as a "PRNDL signal", since it indicates which of the transmission ranges (P, R, N, D or L) has been selected by the vehicle driver. Finally, one or more fluid control or relay valves 60 are provided with a plurality of pressure switches, e.g., 74, 76, 78, for supplying diagnostic signals to control unit 66, e.g., via lines 80, based upon the respective positions of each relay valve 60. The control unit 66, in turn, monitors the various diagnostic signals for the purpose of verifying proper operation of the various controlled elements.

The fluid control valves 58-64 of FIG. 1 are generally characterized as being of the "on/off" or modulated type. The fluid control valves 60 include a set of on/off relay valves (depicted collectively in FIG. 1 as a consolidated block) that are utilized in concert with manual valve 56 to enable controlled engagement and disengagement of the clutches C1-C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch. The modulated valves 62, 64 each comprise a conventional pressure regulator valve (not shown) biased by a variable pilot pressure that is developed by current controlled force motors (not shown). The fluid control valve 58 is also a modulated valve. Valve 58 controls the fluid supply path to converter clutch 19 in lines 70, 72 for selectively engaging and disengaging the converter clutch 19.

The transmission control unit 66 of FIG. 1 is configured to determine, among other things, the commands for smoothly engaging the on-coming clutch while smoothly disengaging the off-going clutch, to thereby shift from one speed ratio to another. The transmission control unit 66 develops the corresponding force motor current commands, and supplies current to the respective force motors in accordance with the current commands. Thus, the clutches C1-C5 are responsive to the pressure commands via the valves 58-64 and their respective actuating elements (e.g., solenoids, current-controlled force motors), described in more detail below with respect to FIG. 2.

Figure 2:
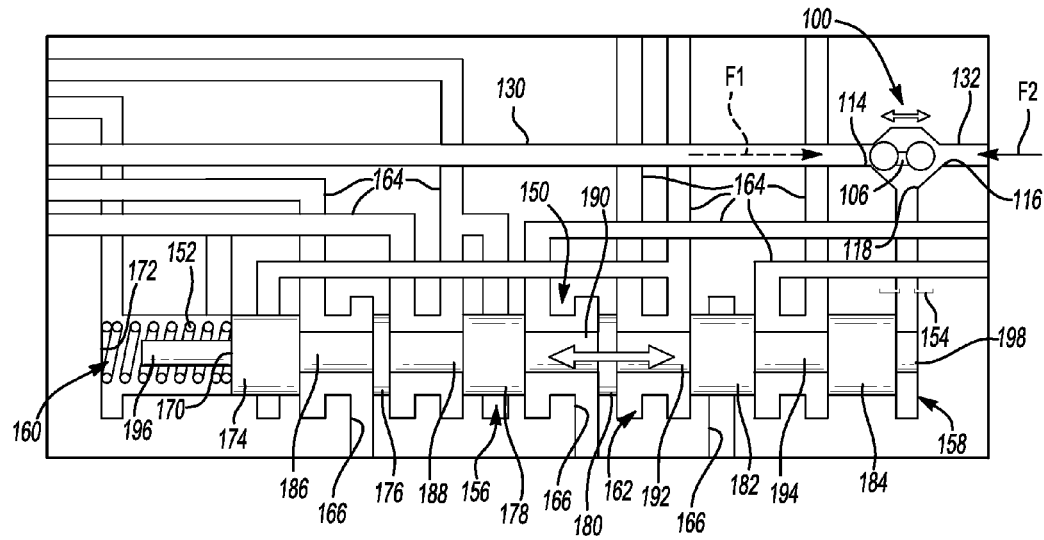
FIG. 2 is a schematic representation of a portion of the hydraulic control system utilized to establish the engagement and disengagement of the various hydraulic components and subsystems shown in FIG. 1.

FIG. 2 provides a schematic representation of a portion of the hydraulic control system 44 utilized to control the engagement and disengagement of the hydraulic components and subsystems of the transmission 14 of FIG. 1 (e.g., torque converter assembly 16, TCC 19, clutches C1-C5, etc.). More particularly, a shuttle-type ball check valve assembly 100, also referred to herein as "check valve" or "valve assembly", in accordance with the present invention is shown in fluid communication with a hydraulic "on/off" valve (referred to hereinafter as spool valve 150) via discharge port 118 through control orifice 154. The check valve 100 and spool valve 150 define, in part, a "shift valve system" that, as will be further explained below, is multiplexed to control engagement and disengagement of one or more torque transmitting devices, e.g., clutches C1-C5 of FIG. 1. The control orifice 154 is employed to regulate the rate of flow (e.g., in gallons/minute or cubic inches/second) of the control medium into the fill cavity 158.

The spool valve 150 includes a spool piston 156 (or "valve spool") extending slidably inside, and coaxially oriented with a spool housing 162, which has a longitudinal form and generally cylindrical configuration. As an axial extension thereof, there is a fill cavity 158 and housing space 160 coaxially arranged at opposing ends of the spool housing 162. The housing space 160 accommodates a biasing member 152 which, for example, consists of a compression spring arrangement having its two ends bearing respectively against a distal end 172 of the of the valve housing 162 and a spring seat surface 170 of the spool piston 156.

A plurality of valve ducts 164 open peripherally into the intermediate part of spool housing 162, arranged between fill cavity 158 and housing space 160. Similarly, a plurality of fluid passages 166 open peripherally into the intermediate part of spool housing 162, arranged between fill cavity 158 and housing space 160 in selective fluid communication with one or more of the plurality of valve ducts 164. The fluid passages 166 lead to an outer connection side of the hydraulic control system 44, where fluid line or ducts (not illustrated) may be connected to other parts of the system (e.g., clutches C1-C5 of FIG. 1).

The spool piston 156 includes first, second, third, fourth, fifth and sixth substantially cylindrical landing portions 174, 176, 178, 180, 182, and 184, respectively, separated by respective first, second, third, fourth, and fifth substantially cylindrical groove portions 186, 188, 190, 192 and 194, respectively. A spring seat 196 extends substantially perpendicularly from the spring seat surface 170 of the first land 174, and a housing connection 198 extends substantially perpendicularly from the sixth land 184.

According to the arrangement of FIG. 2, the spool piston 156 is engaged (i.e., urged in a leftward direction with respect to FIG. 2), through the introduction into fill cavity 158 of control medium (e.g., hydraulic fluid 49 of FIG. 1) having a pressure that is greater than the return force of the biasing member 152. Lateral translation (i.e., leftward movement) of the spool piston 156 inside spool housing 162 places one or more of the valve ducts 164 in fluid communication with one or more respective fluid passages 166, to hydraulically actuate a corresponding transmission component (e.g., clutches C1-C5 of FIG. 1). That same lateral translation of the spool piston 156 inside spool housing 162 also eliminates fluid communication between one or more valve ducts 164 and one or more respective fluid passages 166 by positioning a respective landing portion (e.g., landings 174-184) therebetween, so as to obstruct fluid flow. The return movement (i.e., rightward movement with respect to FIG. 2) of spool piston 156 is effected through the venting of fill cavity 158, owing to the return force of the biasing member 152.

As described in detail below with respect to FIGS. 3A and 3B, the check valve 100 determines whether pressurized fluid is supplied to fill cavity 158 from a first hydraulic circuit 130 via a first feeding or inlet opening 114 (depicted for explanatory purposes by hidden arrow F1 in FIG. 2), or whether pressurized fluid is supplied to fill cavity 158 from a second hydraulic circuit 132 via a second feeding or inlet opening 116 (depicted for explanatory purposes by solid arrow F2 in FIG. 2). The pressurized control medium entering the check valve assembly 100 via the first inlet opening 114 (e.g., arrow F1) preferably has a pressure that is greater than the control medium entering the valve housing 101 via the second inlet opening 116 (e.g., arrow F2).

Figure 3A:
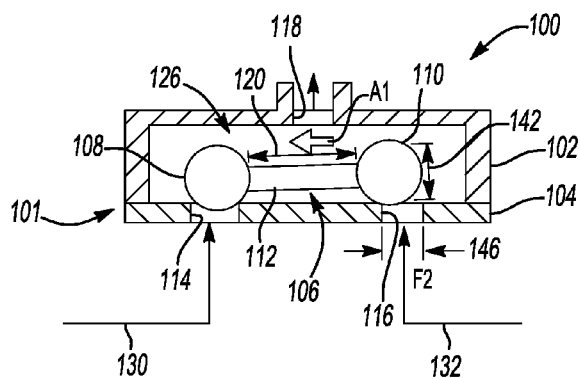
FIG. 3A is a cross-sectional illustration of a dual check ball, check valve assembly in accordance with a preferred embodiment of the present invention, illustrating the dual check ball in a first seated position sealing a first inlet port.
Figure 3B:
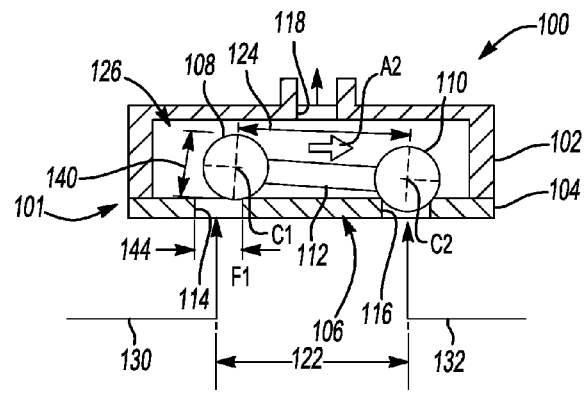
FIG. 3B is a cross-sectional illustration of the dual check ball, check valve assembly of FIG. 3A, illustrating the dual check ball in a second seated position sealing a second inlet port.

FIGS. 3A and 3B are cross-sectional illustrations of the dual check ball, check valve assembly 100 of FIG. 2. The check valve assembly 100 includes a valve housing 101, defined herein by a portion of the control valve upper body 102 and spacer plate 104. The spacer plate 104 portion of the valve housing 101 in turn defines the first and second inlet openings 114, 116 therethrough; oriented as shown in FIG. 2 for transmitting pressurized control medium (e.g., hydraulic fluid 49 of FIG. 1) from respective first and second hydraulic circuits 130, 132 to a fill cavity, such as fill cavity 158 of FIG. 2. In a similar regard, the control valve upper body 102 portion of the valve housing 101 defines the discharge port 118 fluidly communicating the check valve assembly 100 with the fill cavity 158 (FIG. 2). Although depicted in FIGS. 3A-3B as incorporated into a "bathtub" floating check valve configuration, the dual check ball design of the present invention may be integrated into other check valve configurations, including, but not limited to, orifice check valves and the like, without departing from the scope of the claimed invention.

Also included in the check valve assembly 100 is a fluid distribution control element or "dual check ball" 106, which consists of a first obstruction element, depicted herein as first spherical member 108, connected, secured, or attached by central web portion 112 to a second obstruction element, depicted herein as second spherical member 110. As will be described in extensive detail hereinbelow, the first and second spherical members 108, 110 are each configured to respectively engage, interact, or mate with, and thereby fluidly seal the first and second inlet openings 114, 116.

The dual check ball 106 is disposed inside a valve chamber 126, and operable to translate laterally between first and second seated positions, shown respectively in FIGS. 3A and 3B, for alternatively opening and closing the first and second inlet openings 114, 116, to thereby selectively pressurize the discharge port 118 with hydraulic fluid from the first or second hydraulic circuits 130, 132. Referring to FIG. 3A, for example, as pressurized control medium enters the valve chamber 126 via the second inlet opening 116 (e.g., arrow F2), and acts upon the second spherical member 110, the dual check ball 106 is urged in a leftward direction along a substantially linear path, represented herein by arrow A1. Contemporaneously, the first hydraulic circuit 130 is exhausted, creating a pressure gradient across first inlet opening 114, pulling the first spherical member 108 into a seated position, thereby fluidly sealing the first inlet opening 114. In contrast, as pressurized control medium enters the valve chamber 126 via the first inlet opening 114 (e.g., arrow F1), and acts upon the first spherical member 108, the dual check ball 106 is urged in a rightward direction along a substantially linear path, represented herein by arrow A2 in FIG. 3B. Contemporaneously, the second hydraulic circuit 132 is exhausted, creating a pressure gradient across the second inlet opening 116, pulling the second spherical member 110 into a seated position, thereby fluidly sealing the second inlet opening 116.

The dual check ball 106 defines certain geometric characteristics that may be selectively modified depending upon the intended application of the check valve assembly 100 and the particular configuration of the valve body 101. For example, the length 120 of the web portion 112 is designed to restrict the dual check ball 106 from sealing both first and second inlet openings 114, 116 at any one time. Additionally, the length 120 of the web portion 112 is configured to reduce the distance of travel required for the first and second spherical members 108, 110 to translate from an unseated, unsealed position (e.g., spherical member 110 in FIG. 3A) to a seated, sealing position (e.g., spherical member 110 in FIG. 3B). Optimally, the length 120 of the web portion 112 is designed such that the center-to-center length 124 (that being from center C1 of the first spherical member 108 to center C2 of the second spherical member 110, as shown in FIG. 3B) of the dual check ball 106 is substantially equal to, but less than (on the order of about 1 mm) the seat-to-seat length 122 (also shown in FIG. 3B) between center point of the first and second inlet openings 114, 116, thereby minimizing the seat-to-seat distance and, thus the seat-to-seat travel time of the dual check ball 106, while always allowing for at least one path to exhaust oil from fill cavity 158. In effect, the seat-to-seat distance is the space the dual check ball 106 must travel when transitioning from one seated position (e.g., first spherical member 108 seated in the first inlet opening 114, FIG. 3A) to the other (e.g., second spherical member 110 seated in the second inlet opening 116, FIG. 3B).

In a similar respect, the geometric configuration of each first and second obstruction elements (i.e., first and second spherical members 108, 110) is such that when seated in their respective inlet openings 114 and 116 (as described above with respect to FIGS. 3A and 3B) a pressure-tight seal is created. For example, the diameter 142 of the second spherical member 110 (as seen in FIG. 3A) is sized with respect to the diameter 146 of the second inlet opening 116 to thereby create a fluid seal when the second spherical member 110 is seated thereupon. Similarly, referring to FIG. 3B, the diameter 140 of the first spherical member 108 is sized with respect to the diameter 144 of the first inlet opening 114 to thereby create a fluid seal when the first spherical member 108 is seated thereupon.

According to preferred practices, the dual check ball 106 is characterized by a lack of a continuous connection to the valve housing 101. In other words, there is no connecting piece attaching the dual check ball 106 to any one portion of the upper valve body 102 or spacer plate 104. Moreover, the dual check ball 106 preferably consists of a single-piece member, eliminating such unnecessary components as a separate biasing member (e.g., spring), control arm, or guide piece to properly operate. Although depicted in FIGS. 3A and 3B as having substantially spherical designs, the first and second obstruction members can take on other geometric configurations, such as semi-spherical, tear-drop, etc., without departing from the scope of the claimed invention.

While the best modes for carrying out the present invention have been described in detail herein, those familiar with the art to which this invention pertains will recognize various alternative designs and embodiments for practicing the invention within the scope of the appended claims.

The invention claimed is:

1. A check ball valve assembly for use in a hydraulic control unit of a vehicle powertrain, comprising:
    a valve housing including a spacer plate operatively secured to a valve upper body to define a valve chamber therebetween, said spacer plate defining first and second circular inlet openings laterally spaced from one another such that respective centers thereof are a seat-to-seat length apart, said valve upper body defining a discharge port in selective fluid communication with said first and second inlet openings;
    a fluid distribution control element arranged substantially inside said valve chamber to transition between said first and second openings along a substantially linear path of displacement, said fluid distribution control element including:
        a first substantially spherical member dimensioned to fluidly seal said first inlet opening when seated therein;
        a second substantially spherical member dimensioned to fluidly seal said second inlet opening when seated therein; and
        a web portion having a web length, said web portion attaching said first and second substantially spherical members;
    wherein said web length is configured such that a center-to-center length between respective centers of said first and second spherical members is less than said seat-to-seat length; and
    wherein said fluid distribution control element is characterized by a lack of a continuous connection to said valve housing.

* * * * *